US009384115B2

(12) United States Patent
Elisha

(10) Patent No.: US 9,384,115 B2
(45) Date of Patent: Jul. 5, 2016

(54) DETERMINING AND MONITORING PERFORMANCE CAPABILITIES OF A COMPUTER RESOURCE SERVICE

(71) Applicant: Amazon Technologies, Inc., Reno, NV (US)

(72) Inventor: Simon Jeremy Elisha, Sydney (AU)

(73) Assignee: Amazon Technologies, Inc., Reno, NV (US)

( * ) Notice: Subject to any disclaimer, the term of this patent is extended or adjusted under 35 U.S.C. 154(b) by 346 days.

(21) Appl. No.: 13/899,407

(22) Filed: May 21, 2013

(65) Prior Publication Data

US 2014/0351412 A1    Nov. 27, 2014

(51) Int. Cl.
*G06F 11/34* (2006.01)
*H04L 12/26* (2006.01)
*G06F 9/455* (2006.01)

(52) U.S. Cl.
CPC ........ *G06F 11/3428* (2013.01); *G06F 11/3452* (2013.01); *G06F 11/3409* (2013.01); *G06F 11/3495* (2013.01); *G06F 2009/45591* (2013.01); *G06F 2201/815* (2013.01); *H04L 43/0876* (2013.01)

(58) Field of Classification Search
CPC ..... G06F 21/53; G06F 11/30; G06F 11/3409; G06F 11/07; G06F 9/45533; H04L 43/04; H04L 41/5009
See application file for complete search history.

(56) References Cited

U.S. PATENT DOCUMENTS

| | | | |
|---|---|---|---|
| 5,668,944 A * | 9/1997 | Berry ........................... | 714/47.2 |
| 7,870,244 B2 | 1/2011 | Chong et al. | |
| 8,191,069 B2 * | 5/2012 | Watanabe et al. ............ | 718/104 |
| 8,719,818 B2 * | 5/2014 | Chen ..................... | H04L 41/145 714/742 |
| 8,738,972 B1 * | 5/2014 | Bakman et al. .............. | 714/47.2 |
| 2004/0143664 A1 | 7/2004 | Usa et al. | |
| 2009/0070771 A1 * | 3/2009 | Yuyitung et al. ............. | 718/105 |
| 2009/0313620 A1 * | 12/2009 | Sedukhin et al. ................ | 718/1 |
| 2010/0198960 A1 * | 8/2010 | Kirschnick et al. ........... | 709/224 |
| 2010/0274890 A1 * | 10/2010 | Patel et al. .................... | 709/224 |
| 2011/0142053 A1 | 6/2011 | Van Der Merwe et al. | |

(Continued)

OTHER PUBLICATIONS

Kuhn, D. and Reilly, M., "An Investigation of the Applicability of Design of Experiments to Software Testing," Proceedings of the 27th Annual IEEE Software Engineering Workshop, NASA Goddard, Dec. 5-6, 2002, pp. 91-95.*

(Continued)

*Primary Examiner* — Jimmy H Tran
(74) *Attorney, Agent, or Firm* — Robert C. Kowert; Meyertons, Hood, Kivlin, Kowert & Goetzel, P.C.

(57) ABSTRACT

To determine and monitor the performance of a computer resource service in real time, a resource monitoring tool can initiate test virtual machines on the computer systems of the computer resource service. The resource monitoring tool can then monitor various metrics that indicated the performance of the test virtual machines over time, such as processor performance, memory performance, input/output (I/O) performance, and network performance. The resource monitoring tool can store the monitored metrics, provide select metrics to users, and use the metrics to manage the computer resource service. To accurately gauge the performance, the resource monitoring tool can select computer systems for testing that are representative of the computer resource service and the computer resources of the computer resource service.

23 Claims, 7 Drawing Sheets

(56) References Cited

U.S. PATENT DOCUMENTS

| | | | |
|---|---|---|---|
| 2012/0042312 A1 | 2/2012 | Isci et al. | |
| 2012/0089726 A1 | 4/2012 | Doddavula | |
| 2012/0089980 A1 | 4/2012 | Sharp et al. | |
| 2012/0137001 A1 | 5/2012 | Ferris et al. | |
| 2012/0137003 A1 | 5/2012 | Ferris et al. | |
| 2012/0240115 A1* | 9/2012 | Lefurgy et al. | 718/1 |
| 2012/0266166 A1* | 10/2012 | Farkas et al. | 718/1 |
| 2013/0019008 A1* | 1/2013 | Jorgenson et al. | 709/224 |
| 2013/0019242 A1* | 1/2013 | Chen | H04L 41/145 718/1 |
| 2013/0024729 A1* | 1/2013 | Salloum et al. | 714/25 |
| 2013/0218547 A1* | 8/2013 | Ostermeyer et al. | 703/13 |
| 2014/0149784 A1* | 5/2014 | Ngo et al. | 714/4.11 |

OTHER PUBLICATIONS

Christopoulos, V., Lilja, D.J., Schrater, P.R., Georgopoulos, A., 2008, "Independent Component Analysis and Evolutionary Algorithms for Building Representative Benchmark Subsets," Proceedings of the International Symposium on Performance Analysis of Systems and Software (ISPASS) 2008, Austin TX, pp. 169-178.*

Cooper, Brian F., et al. "Benchmarking cloud serving systems with YCSB."Proceedings of the 1st ACM symposium on Cloud computing. ACM, 2010.*

Calheiros, Rodrigo N., et al. "CloudSim: a toolkit for modeling and simulation of cloud computing environments and evaluation of resource provisioning algorithms." Software: Practice and Experience 41.1 (2011): 23-50.*

Buyya, Rajkumar, Rajiv Ranjan, and Rodrigo N. Calheiros. "Modeling and simulation of scalable Cloud computing environments and the CloudSim toolkit: Challenges and opportunities." High Performance Computing & Simulation, 2009. HPCS'09. International Conference on. IEEE, 2009.*

Authorized Officer Lee, W. Young. International Search Report and Written Opinion dated Oct. 7, 2014 from International Application No. PCT/US2014/038745, pp. 1-10.

* cited by examiner

| Test VM ID (502) | Test VM Config. (504) | Loc. (506) | Data Center (508) | Computer System ID (510) | Test Date/Time (512) | CPU Perform. (514) | Memory Perform. (516) | I/O Perform. (518) | Network Perform. (520) | Other Info (522) |
|---|---|---|---|---|---|---|---|---|---|---|
| 00001 | 1.7 GB; 5 CU; 350 GB; 32 bit | Geo. Loc. 1 | Data Center A | 00:A0:C9: 14:C8:29 | 1 May 2013 13:15:06 | 1025 | 5;3 | 100K; 10 | 9.8; 35; 3 | |
| 00002 | 1.7 GB; 5 CU; 350 GB; 32 bit | Geo. Loc. 2 | Data Center D | 00:A0:C9: 05:B8:10 | 1 May 2013 17:20:36 | 800 | 8;4 | 50K; 12 | 7.2; 50; 5 | |
| 00003 | 35.0 GB; 13 CU; 850 GB; 64 bit | Geo. Loc. 1 | Data Center A | 00:A0:C9: 14:C8:29 | 1 May 2013 13:15:06 | 1160 | 3;2 | 200K; 8 | 9.8; 35; 3 | |
| ... | ... | ... | ... | ... | ... | ... | ... | ... | ... | ... |

DETERMINING AND MONITORING PERFORMANCE CAPABILITIES OF A COMPUTER RESOURCE SERVICE

CROSS-REFERENCE TO RELATED APPLICATIONS

This is related to U.S. patent application Ser. No. 13/899,499 filed May 21, 2013, entitled "REPORTING PERFORMANCE CAPABILITIES OF A COMPUTER RESOURCE SERVICE" to Simon Jeremy Elisha, the disclosure of which is incorporated by reference herein in its entirety.

BACKGROUND

Presently, network-accessible computing services sometimes referred to as cloud computing services or remote computing services, offer flexibly to customers in their computing choices. When customers instantiate new virtual machine instances within a computer resource service or migrate instances to the computer resource service, the customers may evaluate the resource characteristics of the instance executing in the computer resource service. This can include, among other possibilities, processor type and performance, memory size and performance, input/output capabilities, ephemeral storage size, and network capabilities.

Each instance type can have a different performance profile providing a degree of choice to the customer. However, it can be difficult to select between different instance types in terms of performance at a given time and location (e.g. a particular datacenter) due to various inconsistencies. For example, the instances may be hosted on differing underlying physical hardware, which may alter the actual performance of the instances (e.g. older hardware may perform differently than newer hardware). Also, instances, which are implemented in "busy" locations in the computer resource service (e.g. noisy neighbors), may provide reduced performance than in a less-subscribed area. Accordingly, it can be challenging to understand the performance profile of the instances in the computer resource service.

BRIEF DESCRIPTION OF THE DRAWINGS

Various features of the implementations can be more fully appreciated, as the same become better understood with reference to the following detailed description of the implementations when considered in connection with the accompanying figures, in which:

FIG. 5 illustrates an example of a data structure for storing performance metrics of a computer resource service, according to various implementations.

DETAILED DESCRIPTION

Implementations of the present disclosure are directed to systems and methods for determining and monitoring the performance of a computer resource service. To determine and monitor the performance of a computer resource service in real time, a resource monitoring tool can initiate test virtual machines on the computer systems of the computer resource service. The resource monitoring tool can then monitor various metrics that indicate the performance of the test virtual machines over time, such as processor performance, memory performance, input/output (I/O) performance, and network performance. The resource monitoring tool can store the monitored performance metrics, provide select performance metrics to users, and use the performance metrics to manage the computer resource service.

Accordingly to implementations, to accurately gauge the performance, the resource monitoring tool can select computer systems for testing that are representative of the computer resource service and the computer resources of the computer resource service. For example, if the computer systems are dispersed at various locations, the resource monitoring tool can select computer systems at the various locations so that the performance at each location can be monitored and compared. Likewise, for example, if the computer systems contain different computing resources (different types and ages of processors, memory, storage, etc.), the resource monitoring tool can select computer systems that represent the different computing resources. Accordingly, the resource monitoring tool can determine and compare the performance of differently located and configured computer systems.

In implementations, the performance metrics can be utilized by the computer resource service to manage the resources of the computer resource service. For example, when allocating computing resources to a instance, the computer resource service can, in real-time, utilize the performance metrics to select computing resources that best fit the needs of a user, balance the current utilization of the computing resources, and select currently available or under utilized resources. Likewise, the computer resource service can utilize the performance metrics to determine when computer systems should be added to the service or when existing computer systems should be upgraded. Accordingly, the performance metrics provided by the resource monitoring tool can allow the computer resource service to efficiently and effectively manage the computer resources provided. Likewise, the performance metrics can be provided to a user to allow the user to make accurate decisions when selecting computing resources and configuration of instances in the computer resource service.

Figure 1:
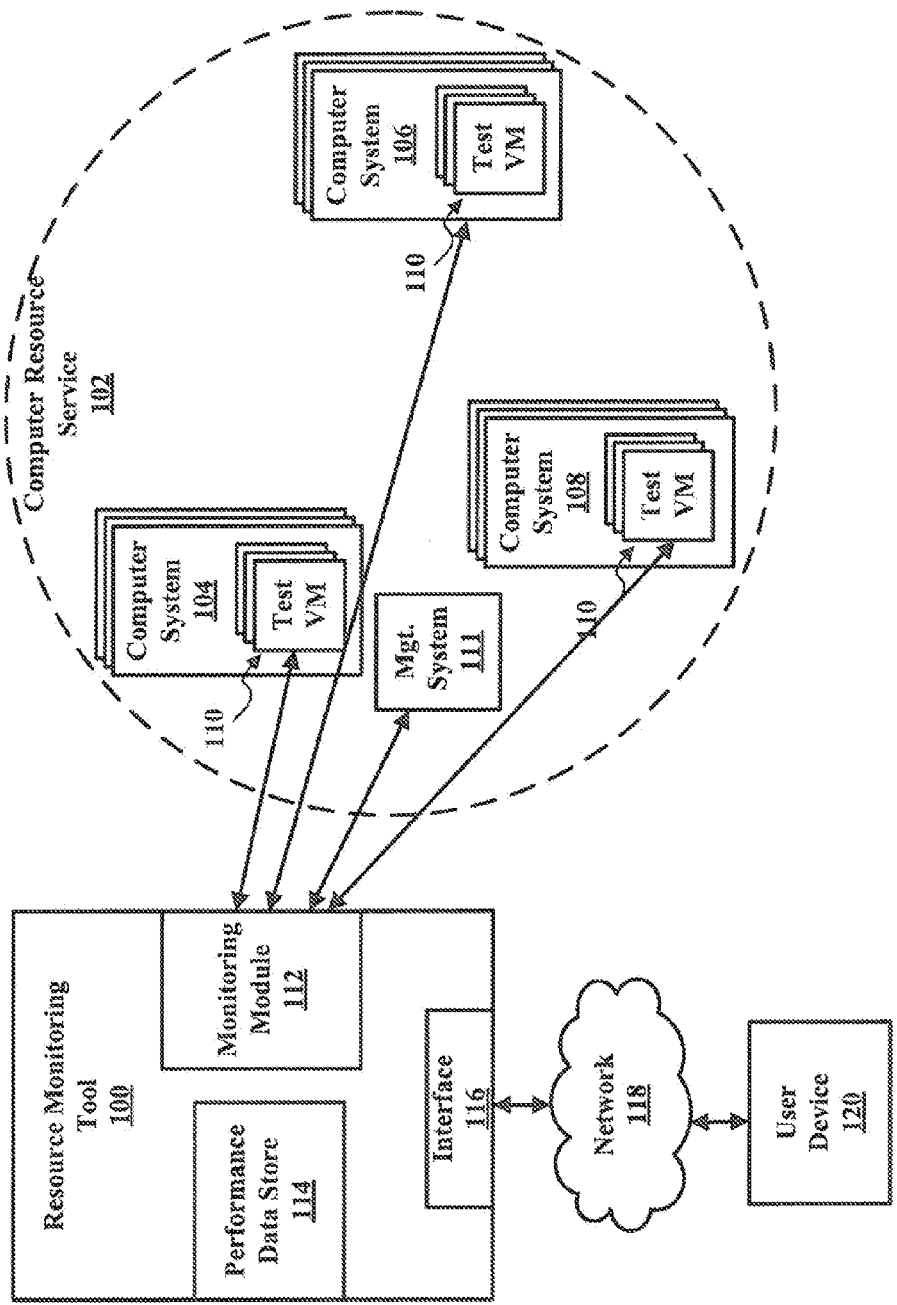
FIG. 1 illustrates an example of an environment in which a resource monitoring tool can monitor a computer resource service, according to various implementations.

FIG. 1 illustrates an example of a resource monitoring tool 100 which can determine and monitor the performance a computer resource service 102, according to various implementations. While FIG. 1 illustrates various components contained in the resource monitoring tool 100, FIG. 1 illustrates one example of a monitoring tool and additional components can be added and existing components can be removed. Likewise, while FIG. 1 illustrates various components contained in the computer resource service 102, FIG. 1 illustrates one example of a computer resource service and additional components can be added and existing components can be removed.

In implementations, the resource monitoring tool 100 can be configured to determine and monitor the performance of the computer resource service 102. The computer resource service 102 can be configured to deliver computing resources to users over one or more networks as a service. For example, users may be able to provision computing resources on a pay-per-use basis, such as on an hourly basis. As illustrated in FIG. 1, the computer resource service 102 can include a number of computer systems such as a set of computer systems 104, a set of computer systems 106, and a set of computer systems 108. To provide computer resources as a service, the computer resource service 102 can be configured to execute one or more machine instances (MIs) on any of the computer systems 104, the computer systems 106, and the computer systems 108.

A MI can correspond to one or more of the computer systems 104, computer systems 106, or computer systems 108. Likewise, a MI can correspond to a virtual machine (VM) hosted by one or more of the computer systems 104, the computer systems 106, and the computer systems 108. A VM can be a virtualized computer system, or a software implementation of a computer system layered on top of any of the computer systems 104, computer systems 106, and computer systems 108. The VM's access to the underlying computer system can be controlled through a hypervisor or virtual machine monitor. The VMs can provide for multiple and/or different operating system environments to run concurrently on a single computer system.

In the computer resource service 102, each MI can be controlled by different users, who can have administrative access only to their own MIs and no access to the instances of other users. Multiple MIs can execute concurrently on a computer system including parallel processors, although multiple instances can appear to execute concurrently on a multi-threaded computer system with fewer processors than instances. In some cases, different MIs, which execute on a computer system, are controlled by two or more different users, while in other cases all of the MIs are controlled by a single user.

The computer resource service 102 can also include one or more management systems 111. The one or more management systems 111 can be configured to control the operation and configuration of the computer resource service 102. The one or more management systems 111 can be configured to initiate execution of the MIs on the computer systems 104, the computer systems 106, and the computer systems 108, configure the MIs in the computer resource service 102, terminate the MIs executing on the computer systems 104, the computer systems 106, and the computer systems 108, and migrate existing MIs between the computer systems 104, the computer systems 106, and the computer systems 108. The one or more management systems 111 can also be configured to provide an interface to users requesting the computer services from the computer resource service 102. The one or more management systems 111 can be implemented as physical computer systems, such as one or more of the computer systems 104, the computer systems 106, and the computer systems 108. Likewise, the one or more management systems 111 can be implemented as one or more MIs executing in the computer resource service 102.

In implementations, the resource monitoring tool 100 can be configured to determine and monitor the performance of the computer resources provided by the computer resource service 102 by testing the operation of the computer systems 104, the computer systems 106, and the computer systems 108. In operation, the performance of the computer systems 104, the computer systems 106, and the computer systems 108 can be affected by the number of MIs executing on the computer systems, the usage of MIs executing on the computer systems, the physical hardware and software supporting the computer systems, and other similar factors. To test the operation of the computer systems 104, the computer systems 106, and the computer systems 108, the resource monitoring tool 100 can be configured to utilize one or more test VMs 110. The resource monitoring tool 100 can be configured to initiate the test VMs 110 on the computer systems 104, the computer systems 106, and the computer systems 108 and test the performance of the test VMs 110.

To accurately represent the computer resource service 102, the resource monitoring tool 100 can be configured to select the number and placement of the test VMs 110 based on the configuration of the computer resource service 102. In the computer resource service 102, the computer systems 104, the computer systems 106, and the computer systems 108 can be placed in different locations. The locations of the computer systems 104, the computer systems 106, and the computer systems 108 can include any granularity of separation within the computer resource service 102. For example, the locations can include specific computer systems in data center, different servers in a rack of servers, different data centers, different geographic location or regions, and the like. Accordingly, in order to test the different locations, the resource monitoring tool 100 can be configured to select a number of computer systems to test from each location of the computer systems 104, the computer systems 106, and the computer systems 108.

Likewise, the computer systems at the different location can offer different computer resources. For example, the computer systems 104, the computer systems 106, and the computer systems 108 can include different configurations of hardware resources and/or software resources. Also, the computer systems 104, the computer systems 106, and the computer systems 108 can include hardware resources and/or software resources of different ages. For example, one or more of the computer systems 104, the computer systems 106, and the computer systems 108 can include older computer systems, which typically employ older hardware resources and software resources and provide reduced computing resources. Accordingly, the resource monitoring tool 100 can be configured to select a number of computer systems, from each location, that represents different configurations and ages.

When selecting the number of computer systems, the resource monitoring tool 100 can select sufficient numbers of computer systems from each of the different locations, different configuration, different ages, and the like to accurately represent the computer systems. That is, the resource monitoring tool 100 can be configured to select a number of computer systems from each of the different locations, different configuration, different ages, and the like that is statistically significant. For example, for a particular location, configuration, or age, the resource monitoring tool 100 can select a number of computer systems that is statistically representative of all the computer systems of the particular location, configuration, or age. This number of computer systems can be a percentage of the total number of computer systems of the particular location, configuration, or age (e.g., 10%, 5%, 1%, etc.). When selecting the computer systems from a particular location, configuration, or age, the resource monitoring tool 100 can randomly select computer systems from the particular location, configuration, or age.

In implementation, when testing the computer resources, the resource monitoring tool 100 can be configured to utilize different configurations of the test VMs 110. In particular, the resource monitoring tool 100 can select test VMs 110 that utilize different amounts of the computer resources offered by the computer resource service 102. The resource monitoring tool 100 can be configured to select preconfigured test VMs 110 that are offered by the computer resource service 102.

Likewise, the resource monitoring tool 100 can be configured to determine various configurations of the test VMs 110 that represent different levels of computer resources.

In implementations, the resource monitoring tool 100 can be configured as a software program that is capable of being stored on and executed by a computer system, whether part of the computer resource service 102 or external to the computer resource service 102. Likewise, the resource monitoring tool 100 can be configured as a software module that is part of other application programs. In any example, the resource monitoring tool 100 can be written in a variety of programming languages, such as JAVA, C++, Python code, Visual Basic, HTML, XML, and the like to accommodate a variety of operating systems, computer system architectures, etc. As illustrated in FIG. 1, the resource monitoring tool 100 can include a monitoring module 112, a performance data store 114, and an interface 116. While illustrated as being part of a single application program, any one of the components of the resource monitoring tool 100 can be implemented as a separate software programs or modules.

In implementations, the monitoring module 112 can be configured to test the performance of the test VMs 110 and monitor performance metrics of the test VMs 110. As the test VMs 110 execute in the computer resource service 102, the monitoring module 112 can be configured test the performance of the test VMs 110. In particular, the monitoring module 112 can be configured to perform one or more benchmarking tests that measure the performance of the test VMs 110. The benchmarking tests can include any types of conventional tests that measure processor performance (e.g., score based on software execution, instruction execution, etc.), memory performance (e.g., latency, read speed, write speed, etc.), input/output (I/O) performance (e.g., I/O per second, I/O bandwidth, etc.), network performance (e.g., network bandwidth, network packets per second, etc.), and the like.

From the benchmarking tests, the monitoring module 112 can be configured to collect performance metrics. The performance metrics include the results of the benchmarking tests. Once collected, the resource monitoring tool 100 can be configured to store the performance metrics in the performance data store 114. The performance data store 114 can be implemented as one or more data structures that can store the performance metrics. The performance data store 114 can also store details of computer resource service 102, details of the computer systems 104, the computer systems 106, and the computer systems 108, details of the test VMs 110, details of the performance tests, and the like.

The performance data store 114 can be configured to store the performance metrics and the other data in a manner that allows relevant information to be linked and correlated. For example, for a particular set of performance metrics, the performance data store 114 can associate the details of the particular test VMs 110 that produced the particular set of performance metrics, details of the particular computer systems on which the particular test VMs 110 executed, the locations of the particular computer systems, details of the performance test that were performed on the particular test VMs 110, and the like.

In implementations, the resource monitoring tool 100 can be configured to utilize a monitoring agent to assist in testing and monitoring the test VMs 110. The monitoring agent can be implemented as a software program that is configured to execute on the test VMs 110 and perform one or more of the performance test. To collect the performance metrics, the monitoring agent can be configured to transmit the performance to the resource monitoring tool 100. The monitoring agent can transmit the performance metrics in real-time, at periodic intervals, on demand, and combination thereof. Likewise, the resource monitoring tool 100, for example via the monitoring module 112, can be configured to communicate with the monitoring agent and retrieve the performance metrics from the monitoring agent. The resource monitoring tool 100 can retrieve the performance metrics in real-time, at periodic intervals, on demand, and combination thereof.

In addition to collecting the performance metrics, the resource monitoring tool 100 can be configured to perform statistical analysis on the performance metrics. The resource monitoring tool 100 can perform the statistical analysis in order to analyze and compare the performance of the computer systems, the performance of the different configurations of the test VMs, and combination thereof. The statistical analysis can be any type of procedure that produces statistical values that aid in analyzing and comparing the performance of the computer systems, the performance of the different configurations of the test VMs, and combination thereof, such as median, mean, standard deviation, statistical ranking based on the relationship, statistical modeling, and the like. Once determined, the resource monitoring tool 100 can store the statistical values in the performance data store 114.

For example, the resource monitoring tool 100 can compare the performance metrics of a particular configuration of a test VM operating on a computer system over time. For instance, the resource monitoring tool 100 can determine the median, mean, and standard deviation of the performance metrics collected over time to evaluate the performance over time. Additionally, for instance, the resource monitoring tool 100 can determine a particular time that the performance metrics fall within a certain percentage relative to performance metrics at other times.

Likewise, for example, the resource monitoring tool 100 can determine statistical values for the performance metrics of different computing systems hosting a particular configuration of a test VM, whether in the same location, different location, or both. In this example, the resource monitoring tool 100 can compare the statistical values to determine the performance of computing systems relative to each other. Additionally, the resource monitoring tool 100 can determine statistical values for the performance metrics of different configurations of test virtual machines, whether executing on the same computer systems, different computer systems, or both. The resource monitoring tool 100 can compare the statistical values to determine the performance of different configurations of the test virtual machines relative to each other.

The resource monitoring tool 100 can also include the interface 116 to allow the user device 120 to communicate, via one or more networks 118, with the resource monitoring tool 100 and access the performance metrics. The user device 120 can include computer devices, such as desktops, laptops, servers, etc., or mobile devices, such as smart telephones, tablet computers, cellular telephones, personal digital assistants, etc. The user device 120 can include hardware resources (e.g., processors, memory, storage, network interface, I/O devices, etc.) and software resource (e.g., operating systems, application programs, mobile apps, etc.) that are found in conventional computer devices.

In implementations, the interface 116 can be any type of interface that allows a user to communicate, locally and remotely, with the resource monitoring tool 100. For example, the interface 116 can include a graphical user interface ("GUI") or command-line interface that allows a user to interact with the resource monitoring tool via the computer system on which the resource monitoring tool 100 is executing. Also, for example, the interface 116 can include a web-based interface that allows the user device 120 to remotely communicate with the resource monitoring tool 100 using a web-based application, such as a web browser. Likewise, for example, the interface 116 can include an application programming interface ("API") that allows applications on the user device 120 to communicate with the resource monitoring tool 100. In some implementation, the interface can be a Web Service API.

In implementations, a user of the user device 120 can desire to evaluate the performance of the computer resource service 102. For instance, the user can desire to determine the best location, computer systems, and configuration of MIs to be initiated in the computer resource service. To achieve this, the user device 120 can send a request, to the resource monitoring tool 100, to provide a set of the performance metrics. In response, the resource monitoring tool 100 can be configured to search the performance data store 114 and retrieve a set of the performance metrics that match the request of the user device 120. The resource monitoring tool 100 can be configured to send the set of performance metrics to the user device 120.

To provide meaningful information to the user device 120, the resource monitoring tool 100 can be configured to utilize filters when determining the set of performance metrics to retrieve for the user device 120. In particular, the resource monitoring tool 100 can utilize the filters to determine the particular performance metrics to retrieve for the user device. The filters can include one or more parameters that specify which of the performance metrics is desired by the user device 120.

For example, the filters can include one or more parameters related to the computer systems in the computer resource service 102. These can include an identification of a particular locations or regions where the computer systems are located, an identification of a particular configurations of the computer systems, and the like. Additionally, for example, the filters can include one or more parameters related to the test VMs 110 or the tests performed on the test VMs 110. These parameters can include an identification of a particular type or configuration of a test VMs 110, an identification of a location or region the test VMs 110 where initiated, an identification of a benchmarking test, a date or time range that tests were performed, and the like. Also, for example, the filters can include one or more parameters around the performance metrics themselves. These parameters can include a particular type of performance metric (e.g., processor performance, memory performance, I/O performance, network performance, etc.), a particular value for the performance metrics, particular statistics of the performance metrics (e.g., average values, median values, certain percentile, etc.), and the like.

A complete description of the interface 116 and processes associated with the interface 116 can be found in U.S. patent application Ser. No. 13/899,449 filed May 21, 2013, entitled "REPORTING PERFORMANCE CAPABILITIES OF A COMPUTER RESOURCE SERVICE" to Simon Jeremy Elisha, the disclosure of which is incorporated by reference herein in its entirety.

Figure 2:
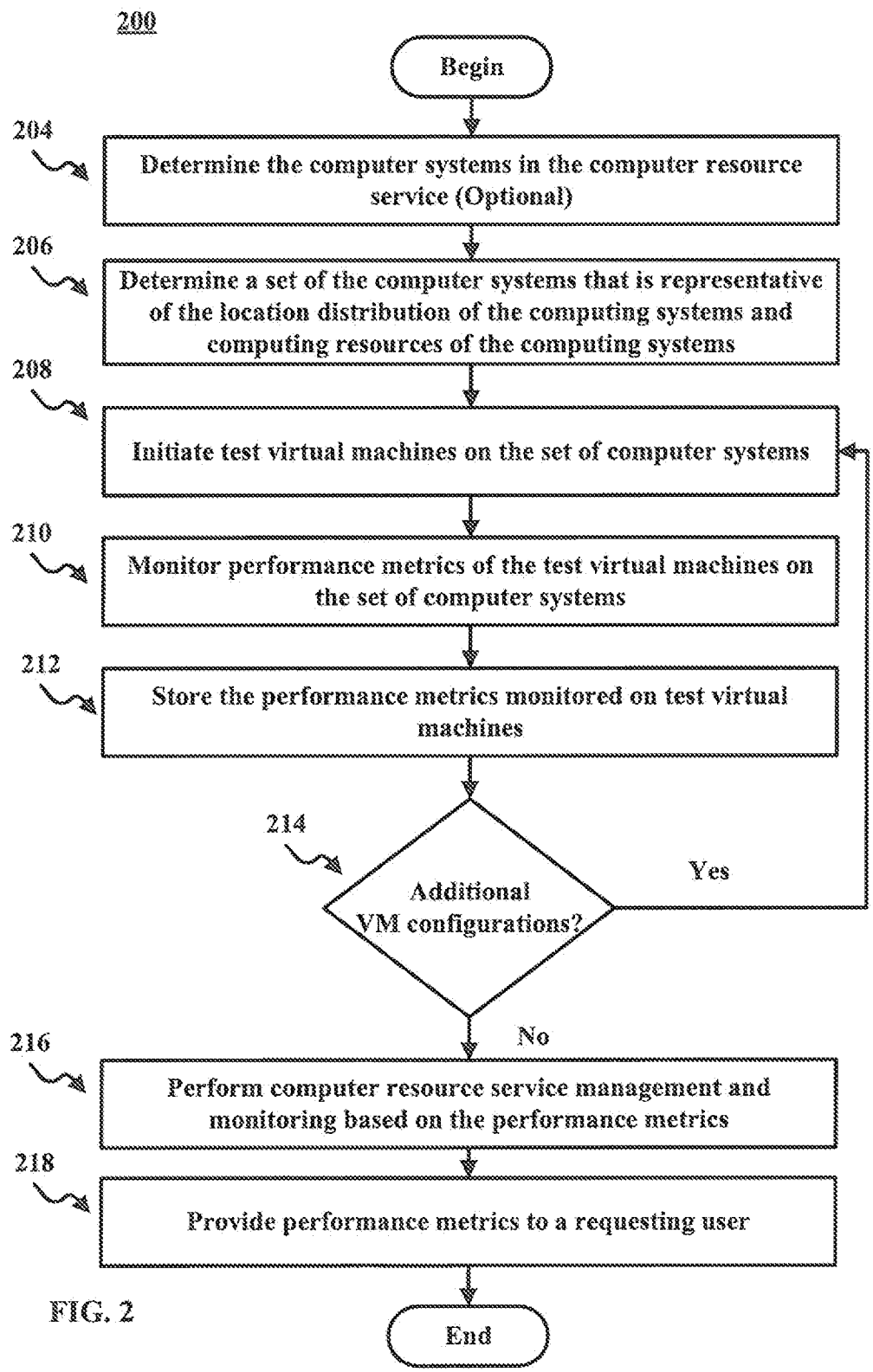
FIG. 2 illustrates an example of a process for monitoring performance of a computer resource service, according to various implementations.

FIG. 2 illustrates a process 200 for determining and monitoring the performance of a computer resource service, according to various implementations. In the process 200, the illustrated stages are examples and any of the illustrated stages can be removed, additional stages can be added, and the order of the illustrated stages can be changed. Additionally, while the process 200 is described as being performed by the resource monitoring tool 100, one or more of the stages of the process 200 can be performed by any hardware or software component.

In 204, the resource monitoring tool 100 can optionally determine the computer systems in the computer resource service 102. The resource monitoring tool 100 can determine identification information for the computer systems 104, computer systems 106, and computer systems 108, such as the location of the computer systems, the names of the computer systems, the network addresses of the computer systems, access information for the computer systems, and the like. Additionally, the resource monitoring tool 100 can determine details of the computer systems 104, computer systems 106, and computer systems 108, such as hardware and software components of the computer systems. To determine this information, the resource monitoring tool 100 can scan the computer systems 104, computer systems 106, and computer systems 108. Likewise, the resource monitoring tool 100 can communicate with one or more management systems 111 of the computer resource service 102 to acquire the information. Additionally, the locations and configurations of the computer systems can also be preprogrammed in the resource monitoring tool 100.

In 206, the resource monitoring tool 100 can determine a set of the computer systems that is representative of the location distributions of the computer systems and the computing resources of the computer systems. That is, the resource monitoring tool 100 can select computer systems that represent different locations of the computer systems and different computer resource configurations of the computer systems. The number of computer systems selected can be statistically significant so that an accurate measure of the performance can be determined.

For example, if the computer systems 104 are located at a first location and the computer systems 106 are located at a second location, the resource monitoring tool 100 can select a number of the computer systems 104 and a number of the computer systems 106 that are representative of each location and yield reliable performance metrics, e.g. 5% of the computer systems 104 and 5% of the computer systems 106. Likewise, in this example, the computer systems 104 can have two computer resource configurations: e.g. a first group of computer systems 104 have the same processors, memory, and network bandwidth and a second group of the computer systems 104 have the same processor, memory, and network bandwidth but different from the first group. When selecting computer systems from the computer systems 104, the resource monitoring tool 100 can select a statistically significant number from both the first group and the second group.

In 208, the resource monitoring tool 100 can initiate test VMs on the set of computer systems. The resource monitoring tool 100 can select the same configuration for each of the test VMs so that the performance can be compared and correlated between the computer systems. For example, the resource monitoring tool 100 can select a test VM 100 that is configured to offer particular computer resources (e.g., processing power, memory, I/O resources, network bandwidth, etc.). The resource monitoring tool 100 can configure the test VMs 110. Likewise, the resource monitoring tool 100 can select a preconfigured virtual machine to initiate on the computer systems.

In 210, the resource monitoring tool 100 can monitor performance metrics of the test VMs on the set of computer systems. The resource monitoring tool 100 can remotely monitor the performance metrics via a network connection. Likewise, the resource monitoring tool 100 can install a performance monitoring agent on one or more of test virtual machines and receive or retrieve the performance metrics from the monitoring agent. The resource monitoring tool 100 can monitor the performance metrics over time in order to determine the performance metrics at various times.

The resource monitoring tool 100 and/or the monitoring agent can run various benchmarking test on the test VMs 110. The benchmarking tests can include any types of conventional tests that measure processor performance (e.g., score based on software execution, instruction execution, etc.), memory performance (e.g., latency, read speed, write speed, etc.), input/output (I/O) performance (e.g., I/O per second, I/O bandwidth, etc.), network performance (e.g., network bandwidth, network packets per second, etc.), and the like.

In 212, the resource monitoring tool 100 can store the performance metrics monitored for the test VMs. The resource monitoring tool 100 can store the performance metrics in one or more data structures, such as the performance data store 114. The resource monitoring tool 100 can store the performance metrics as well as other information. The other information can include, for example, the information collected in 204.

In 214, the resource monitoring tool 100 can repeat the process for different configurations of the test VMs. To acquire a complete picture of the computer resources of the computer resource service 102, the resource monitoring tool 100 can perform the testing and monitoring of the performance metrics for different configurations of the test VMs 110, such as different offerings of particular computer resources (e.g., processing power, memory, I/O resources, network bandwidth, etc.)

In 216, the resource monitoring tool 100 can perform resource management and monitoring based on the performance metrics. The resource monitoring tool 100 can utilize the performance metrics to assist in any process that requires determination of the performance of the computer resources of the computer resource service 102. The resource management and monitoring can be performed by the resource monitoring tool 100. Likewise, the resource monitoring tool 100 can provide the performance metrics to another system, such as the one or more resource management systems 111, to assist in the resource management.

For example, performance metrics can be utilized to determine a particular machine on which to initiate new MIs. For instance, if a particular computer system shows good performance metrics for the test VMs, the particular computer systems can be selected (or given higher priority) for hosting new MIs. Likewise, if a particular computer system shows poor performance metrics for the test VMs, the particular computer system can be suspended (or given lower priority) for hosting new MIs.

Additionally, for example, the performance metrics can be utilized to balance the MIs currently hosted in the computer resource service 102. For instance, if a particular computer system shows poor performance metrics for the test VMs, one or more MIs hosted by the particular computer system can be migrated to a different computer system that shows better performance metrics.

Also, for example, the performance metrics can be utilized in the pricing of the computer resources offer by the computer resource service 102. For instance, if a particular computer system shows poor performance metrics for the test VMs and is correlated to older hardware of the particular system, a lower price can be set of the computer resources offered by the particular computer system. Likewise, for instance, if a particular computer system shows good performance metrics for the test VMs and is correlated to newer hardware of the particular system, a higher price can be set of the computer resources offered by the particular computer system.

Further, for example, the performance metrics can be utilized in determining whether to upgrade one or more of the computer systems. For instance, if a particular computer system shows poor performance metrics for the test VMs and is correlated to older hardware of the particular system, a decision can be made to update the hardware of the particular computer system.

In 218, the resource monitoring tool 100 can provide the performance metrics to a requesting user. The resource monitoring tool 100 can receive a request from a user, such a user device 120, for a set of the performance metrics. For example, the resource monitoring tool 100 can receive the request via the interface 116. The request can include one or more filters that specify the particular set of performance metrics requested by the user. In response, the resource monitoring tool 100 can search the performance data store 114 based on the filters and retrieve the set of performance metrics. The resource monitoring tool 100 can provide the set of performance metrics to the user via the interface 116.

Once received, the user can perform various actions utilizing the set of performance metrics. For example, the user device 120 can perform actions associated with the computer resource service. The user device 120 can utilize the performance metrics to assist in any process that requires determination of the performance of the computer resources of the computer resource service 102.

For example, performance metrics can be utilized to determine a particular computer system or location of computer systems on which to initiate new MIs. For instance, if a particular computer system or particular location of computer systems shows good performance metrics for the test VMs, the user device 120 can be initiate (or request initiation) of new MIs on the particular computer system or in a the particular location. Likewise, for example, if the user device receives a set of performance metrics for different configurations of test VMs, the user device 120 can utilize the set of performance metrics in selecting a configuration for MIs to be initiated in the computer resource service. Additionally, for example, the performance metrics can be utilized to balance the MIs currently hosted in the computer resource service 102. For instance, if a particular computer system shows poor performance metrics for the test VMs, one or more MIs hosted by the particular computer system can be migrated to a different computer system that shows better performance metrics.

After 218, the process can end, repeat, or return to any point.

Figure 3A:
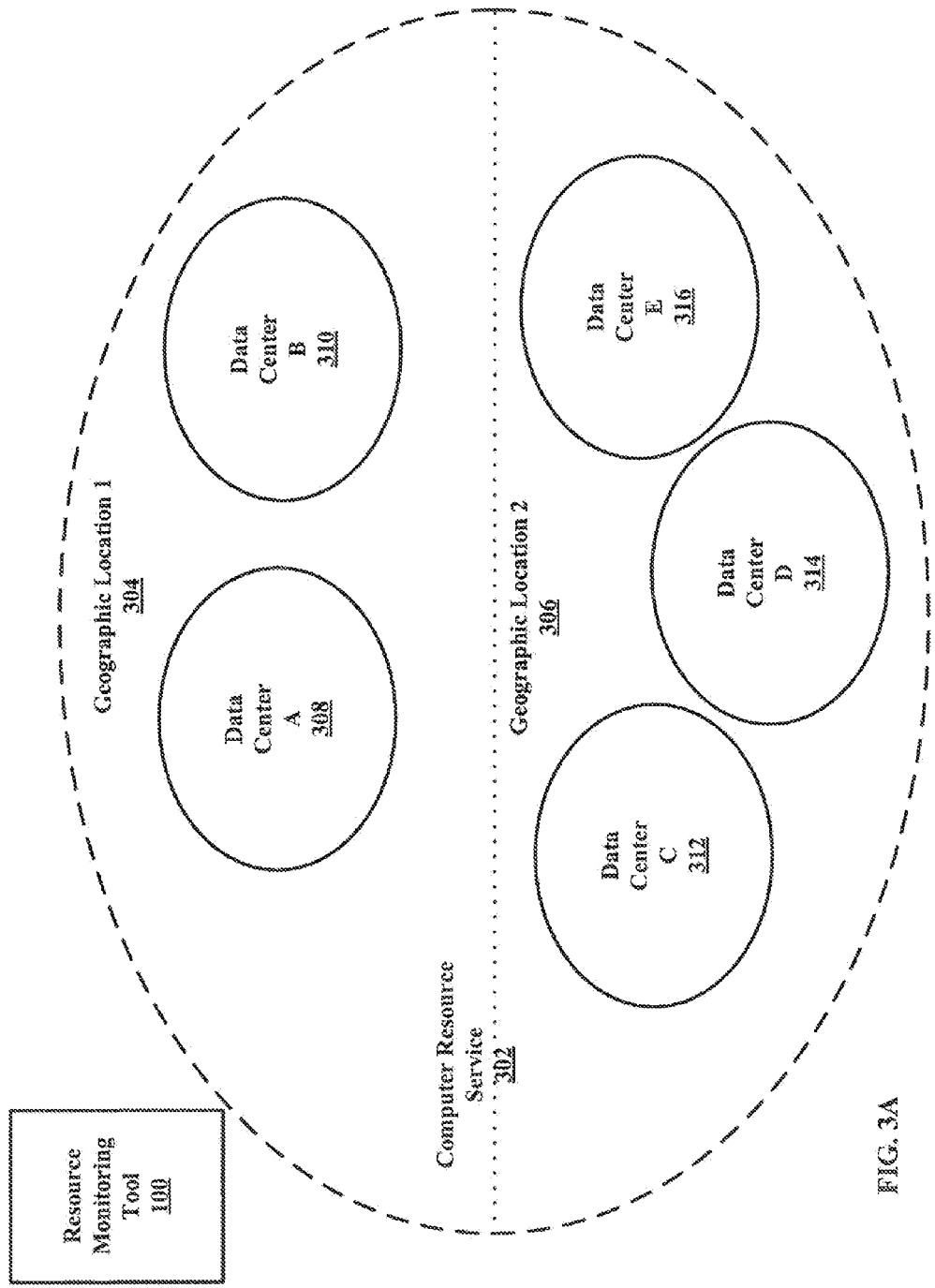
FIGS. 3A and 3B illustrate another example of an environment in which a resource monitoring tool can monitor a computer resource service, according to various implementations.
Figure 3B:
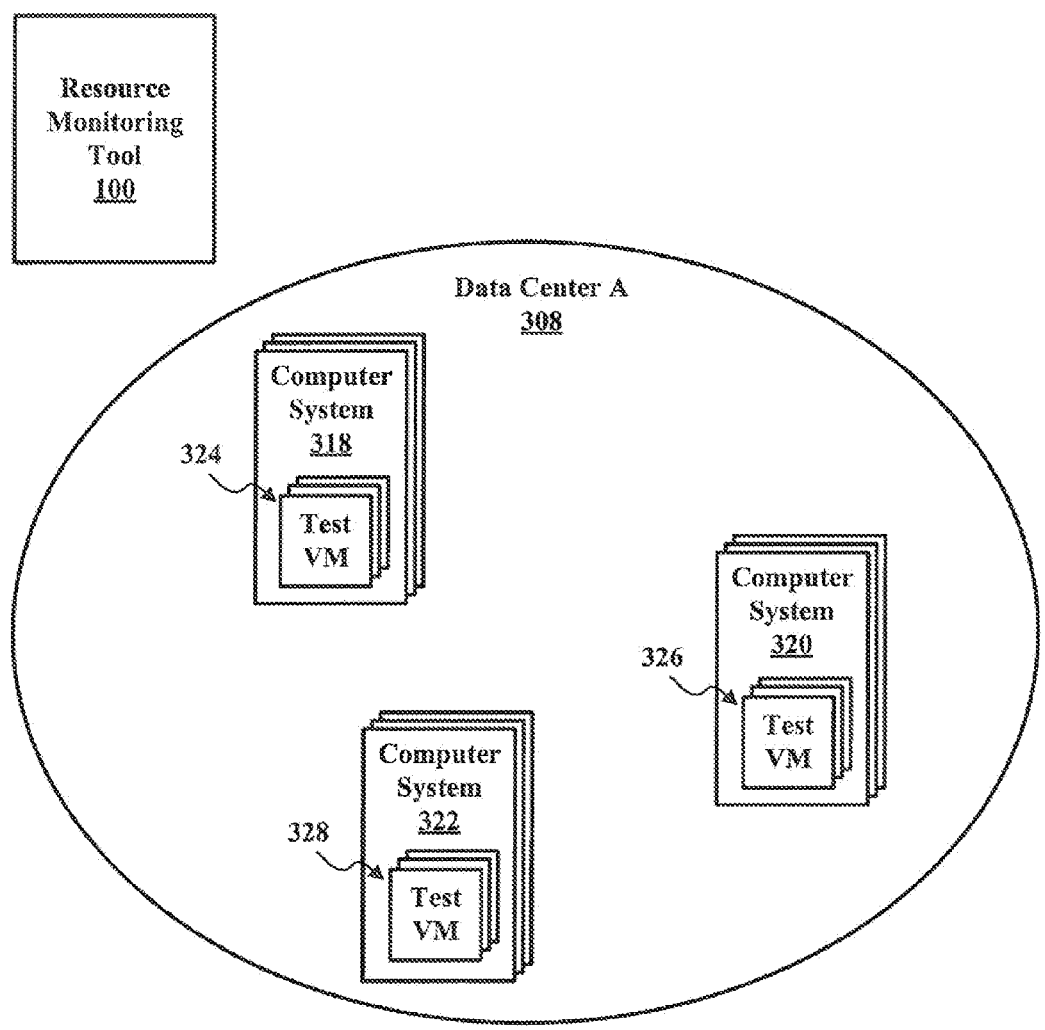

FIGS. 3A and 3B illustrate another example of the resource monitoring tool 100 which can determine and monitor the performance a computer resource service 302, according to various implementations. While FIGS. 3A and 3B illustrate various components contained in the resource monitoring tool 100, FIGS. 3A and 3B illustrate one example of a monitoring tool and additional components can be added and existing components can be removed. Likewise, while FIGS. 3A and 3B illustrate various components contained in the computer resource service 302, FIGS. 3A and 3B illustrate one example of a computer resource service and additional components can be added and existing components can be removed.

In implementations, the computer resource service 302 can provide computing resources as a service to users that are located in regionally and geographically distinct locations. In provide services to the regionally and geographically distinct locations, the computer systems of the computer resource service 302 can be dispersed among the various geographic locations and regional locations. As illustrated in FIG. 3A, the computer resource service 302 can be divided into several geographic locations or regions, for example, geographic location 1 304 and geographic location 2 306. That is, the various computer systems supporting the computer resource service 302 can be located in different geographic locations to support computer resources offered in the different geographic locations.

For example, the computer resource service 302 can include a number of data centers, for example, a data center A 308, a data center B 310, a data center C 312, a data center D 314, and a data center E 316. As illustrated in FIG. 3A, the data center A 308 and the data center B 310 can be located in the geographic location 1 304. The data center C 312, data center D 314, and the data center E 316 can be located in the geographic location 2 306. The data centers within a particular geographic location can also be dispersed in sub-regions of the particular geographic location.

As illustrated in FIG. 3B, the data center A can include a number of computer systems, such as computer systems 318, computer systems 320, and computer systems 322. Likewise, the data center B 310, the data center C 312, the data center D 314, and the data center E 316 can include a number of computer systems. To determine and monitor the performance of the data, the resource monitoring tool 100 can be configured to initiate test VMs 324, 326, and 328 on the computer systems 318, computer systems 320 and computer systems 322, respectively. As described below, the resource monitoring tool 100 can be configured to select the computer systems so as to accurately represent the computer resources of the data center A 308 of the computer resource service 302.

When determining where to host MIs in the computer resource service 302, the computer resource service 302 can desire to determine the performance of the computer systems across all the geographic and regional locations. Likewise, when utilizing the computer resource service 302, users can desire to determine the computer systems that will provide computing resources that best fits the users' needs. For example, users can desire to determine the performance of computer systems within their geographic location as well as computer systems in other geographic locations. Accordingly, the resource monitoring tool 100 can monitor and determine the performance metrics that are representative of the locations of the computer system and the configurations of the computer systems.

Figure 4:
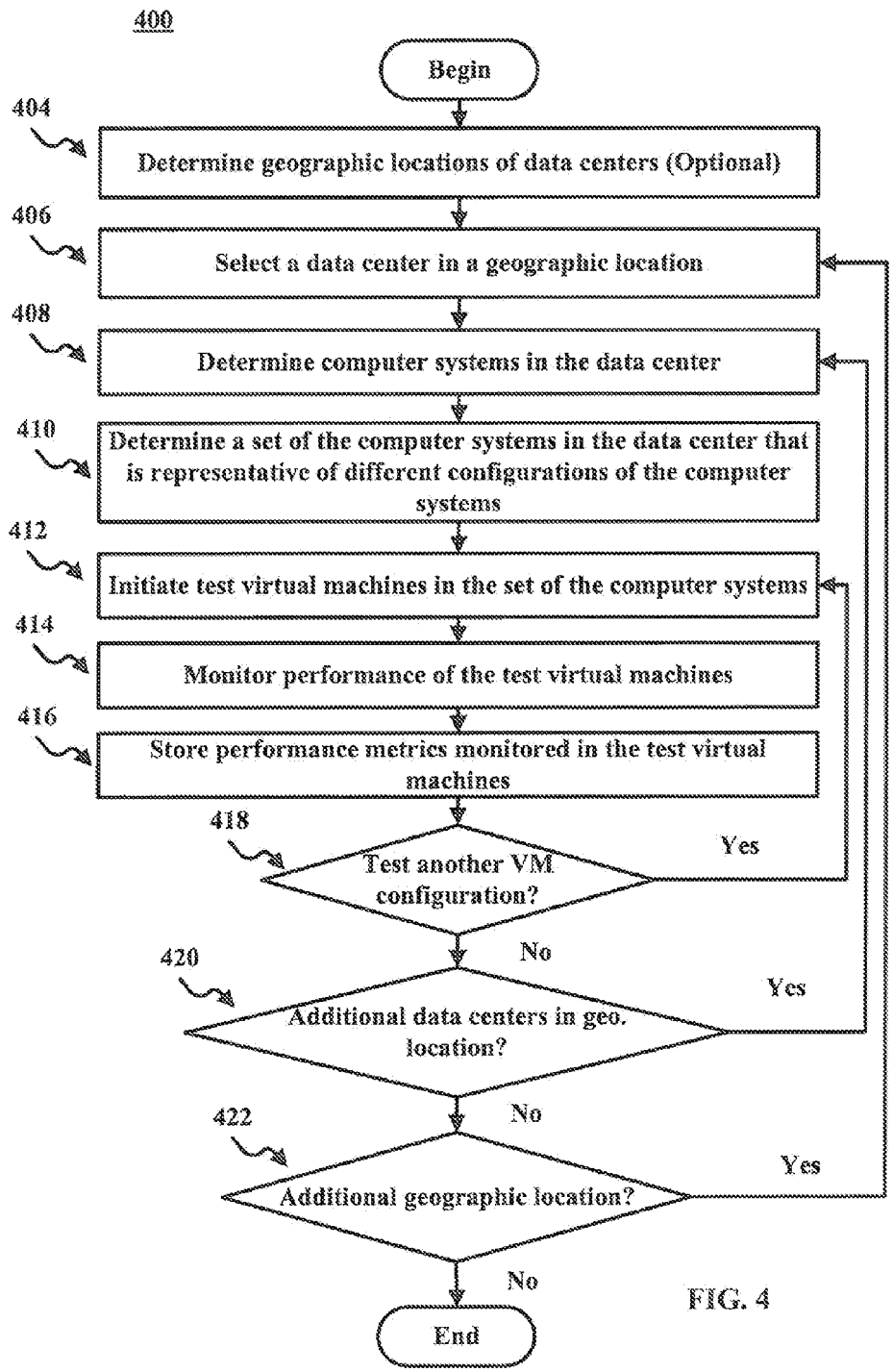
FIG. 4 illustrates another example of a process for monitoring performance of a computer resource service, according to various implementations.

FIG. 4 illustrates a process 400 for monitoring the performance of a computer resource service, such as computer resource service 302, according to various implementations. In the process 400, the illustrated stages are examples and any of the illustrated stages can be removed, additional stages can be added, and the order of the illustrated stages can be changed. Additionally, while the process 400 is described as being performed by the resource monitoring tool 100, one or more of the stages of the process 400 can be performed by any hardware or software component.

In 404, the resource monitoring tool 100 can optionally determine geographic locations of data centers in the computer resource service. The resource monitoring tool 100 can scan the computer resource service and determine the geographic locations of the data centers in a computer resource service. Likewise, the resource monitoring tool 100 can communicate with one or more management systems 111 of the computer resource service and determine the geographic locations of the data centers in a computer resource service. The geographic locations of the data centers can also be preprogrammed in the resource monitoring tool 100.

For example, referring to FIG. 3A, the resource monitoring tool 100 can determine that the computer resource service 302 includes a geographic location 1 304 with the data center A 308 and the data center B 310 and a geographic location 2 306 with the data center C 312, the data center D 314, and the data center E 316.

In 406, the resource monitoring tool 100 can select a data center in a geographic location to test. For example, the resource monitoring tool 100 can select any one of the data center A 308, the data center B 310, the data center C 312, the data center D 314, and the data center E 316. The resource monitoring tool 100 can select the particular data center randomly or select the particular data center based on a predetermined order.

In 408, the resource monitoring tool 100 can determine the computer systems in the data center. The resource monitoring tool 100 can determine identification information for and details of the computer systems of the data center currently being tested. The identification information can include the names of the computer systems, the network addresses of the computer systems, access information for the computer systems, and the like. The details of the computer systems can include hardware and software components of the computer systems.

For example, for the data center A 308, the resource monitoring tool 100 can determine identification information for the computer systems 318, computer systems 320, and computer systems 322, such as the names of the computer systems, the network addresses of the computer systems, access information for the computer systems, and the like. Additionally, the resource monitoring tool 100 can determine details of the computer systems 318, computer systems 320, and computer systems 322, such as hardware and software components of the computer systems. To determine this information, the resource monitoring tool 100 can scan the computer systems 318, computer systems 320, and computer systems 322. Likewise, the resource monitoring tool 100 can communicate with one or more management systems 111 of the computer resource service 302 to acquire the information.

In 410, the resource monitoring tool 100 can determine a set of the computer systems in the data center that is representative of different configurations of the computer systems. For each different configuration of the computer systems, the resource monitoring tool 100 can select a number of computer systems, for each configuration, that is statically significant, i.e., a large enough sample of the computer systems to provide statistically meaningful performance metrics.

For example, the computer systems 318 and the computer systems 320 can include computer systems with different configurations (e.g., different age or type of hardware resources). The resource monitoring tool 100 can select a number of the computer systems 318 and a number of the computer systems 320 that are representative of each location and yield reliable performance metrics, e.g. 5% of the computer systems 318 and 5% of the computer systems 320.

In 412, the resource monitoring tool 100 can initiate test VMs in the set of the computer systems. The resource monitoring tool 100 can select the same configuration for each of the test VMs so that the performance can be compared and correlated between the computer systems. For example, for the data center A 308, the resource monitoring tool 100 can select a configuration for the test VMs 324, 326, and 328 that is configured to offer particular computer resources (e.g., processing power, memory, I/O resources, network bandwidth, etc.). The resource monitoring tool 100 can configure the test VMs 324, 326, and 328. Likewise, the resource monitoring tool 100 can select a preconfigured test VM for the test VMs 324, 326, and 328 to initiate on the computer systems.

In 414, the resource monitoring tool 100 can monitor the performance of the test virtual machines. The resource monitoring tool 100 can remotely monitor the performance metrics via a network connection. Likewise, the resource monitoring tool 100 can install a performance monitoring agent on one or more of test virtual machines and receive or retrieve the performance metrics from the monitoring agent. The resource monitoring tool 100 can monitor the performance metrics over time in order to determine the performance metrics at various times.

The resource monitoring tool 100 and/or the monitoring agent can run various benchmarking tests on the test VMs 324, 326, and 328. The benchmarking tests can include any types of conventional tests that measure processor performance (e.g., score based on software execution, instruction execution, etc.), memory performance (e.g., latency, read speed, write speed, etc.), input/output (I/O) performance (e.g., I/O per second, I/O bandwidth, etc.), network performance (e.g., network bandwidth, network packets per second, etc.), and the like.

In 416, the resource monitoring tool 100 can store the performance metrics monitored in the test virtual machines. The resource monitoring tool 100 can store the performance metrics in one or more data structures, such as the performance data store 114. The resource monitoring tool 100 can store the performance metrics as well as other information. The other information can include, for example, the information collected in 204.

For example, FIG. 5 illustrates an example of a data structure that can store the performance metrics monitored from the test VMs. While FIG. 5 illustrates an example of a data structure, the illustrated structure is one example, and any type of data structure can be utilized to store the performance metrics. Likewise, while FIG. 5 illustrates examples of performance metrics that can be stored, the illustrated performance metrics are one example, and any type of performance metrics or other information can be monitored and stored by the resource monitoring tool 100.

As illustrated, the resource monitoring tool 100 can store the performance metrics in a table 500. The table 500 can include a number of rows and columns. Each row can store the performance metrics and other data for a particular test VM. Each column can store a particular type of information for a test VM. The table 500 can include a column 502 that stores an identifier for each test VM. The identifier can be any value that uniquely identifies a test VM. For example, the identifier can be a numerical value, such as "00001."

The table 500 can also include a column 504 that stores configuration information describing the computing resources allocated to the test VMs. The configuration information can include any information describing the computing resources allocated to the test VMs, such as memory allocated to the test VMs, processing power allocated to the test VMs, storage allocated to the test VMs, networking resources allocated to the test VMs, data processing architecture of the test VMs, and the like. For example, as illustrated, the column 504 can include the information: "allocated memory (# of bytes); processing power (compute units); storage (# of bytes); architecture (# of bits)." For instance, the for test VM "00001," the column 504 can include allocated memory of "1.7 GB," processing power of "5 CU," storage of "320 GB," and architecture of "32 bit."

The table 500 can also include columns 506 and 508 that store the location information the computer systems hosting the test VMs. Column 506 can include the regional or geographic information of the test VMs, such as regional or geographic identification and description. For instance, for the test VM "00001," the column 506 can include a location of "Geographic Location 1" (as referenced in FIG. 3A). The column 508 can include additional location information for the particular location, such as a sub-region or data center including the computer systems hosting the test VMs. For instance, for the test VM "00001," the column 508 can include "Data Center A," indicating that the computer system hosting the test VM "00001."

The table 500 can also include a column 510 that stores an identifier of the computer system that is hosting the test VMs. The identifier can be any value that uniquely identifies a computing system. For example, the identifier can be the Media Access Control (MAC) address of a computer system. For instance, for the test VM "00001," the column 510 can include the value "00:A0:C9:14:C8:29," the MAC address in hexadecimal.

The table 500 can also include a column 512 that store the time and date information for the tests performed by the test VMs. The time and date information can include any information that identifies when test were performed, when the performance metrics where collected, and the like. For example, as illustrated, the column 512 can include the date as "day month year" and the time as "hours:minutes:seconds." For instance, for the test VM "00001," the column 512 can include a date of "1 May 2013" and a time of "12:15:06."

The table 500 can also include columns 514, 516, 518, and 520 that store the performance metrics collected by the test VMs. The column 514 can store performance metrics associated with processor performance. The processor performance can be any value produced by a particular benchmarking test. For instance, for the test VM "00001," the column 514 can include the value "1025." which corresponds to a score of a particular benchmarking test. The column 516 can store performance metrics associated with memory performance tests. For example, as illustrated, the column 516 can include the performance metrics: "page update speed (seconds); latency (seconds)." For instance, for the test VM "00001," the column 516 can include a page update speed of "5" seconds and a latency of "3" seconds.

The column 518 can store performance metrics associated with I/O performance tests. For example, as illustrated, the column 518 can include the performance metrics: "input/output per seconds; latency (seconds)." For instance, for the test VM "00001," the column 518 can include a IOPS of "100,000" and a latency of "10" seconds. The column 520 can store performance metrics associated with network performance tests. For example, as illustrated, the column 520 can include the performance metrics: "network bandwidth (# of Mbit per second); number of dropped packets; latency (seconds)." For instance, for the test VM "00001," the column 520 can include a network bandwidth of "9.8" Mbit/s, a number of dropped packets of "10," and a latency of "3" seconds.

The table 500 can also include a column 522 that can store any additional information. For example, the column can include information, such as duration of the tests, identification of the benchmarking tests performed, identification of the system executing the resource monitoring tool 100, and the like.

In 418, the resource monitoring tool 100 can determine whether to test additional virtual machine configurations. To acquire a complete picture of the computer resources of the computer resource service 302, the resource monitoring tool 100 can perform the testing and monitoring of the performance metrics for different configurations of the test VMs 324, 326, and 328, such as different offerings of particular computer resources (e.g., processing power, memory, I/O resources, network bandwidth, etc.)

In 420, the resource monitoring tool 100 can determine if there are additional data centers in the geographic location. For example, the resource monitoring tool 100 can determine that data center B 310 also needs to be tested. The resource monitoring tool 100 can repeat to processes above for the data center B 310. As such, the resource monitoring tool 100 can determine and monitor performance metrics for all data centers in the geographic location 1 304.

In 422, the resource monitoring tool 100 can determine if there are additional geographic locations. For example, the resource monitoring tool 100 can determine that the geographic location 2 306 needs to be tested. The resource monitoring tool 100 can repeat to processes above for the data center C 312, the data center D 314, and the data center E 316 of the geographic location 306. As such, the resource monitoring tool 100 can determine and monitor performance metrics for all data centers in both the geographic location 1 304 and the geographic location 2 306.

The resource monitoring tool 100 can continue to monitor the performance metrics over time. Accordingly, the resource monitoring tool 100 can determine the performance metrics over time and determine how the performance metrics change over time.

After 422, the process can end, repeat, or return to any point.

In the implementations described above, the performance metrics collected by the resource monitoring tool 100 can be utilized in a variety of process associated with computer resource service. In implementations, as described above, the performance metrics can be utilized to determine which computer systems in the computer resource service 302 should support MIs, the pricing the computer resources of the computer resource service 302, decision regarding the updating of the computer systems of the computer resource service 302, and the like.

In the implementations described above, the resource monitoring tool 100 can continue to monitor the performance metrics over time. Accordingly, the resource monitoring tool 100 can determine the performance metrics over time and determine how the performance metrics change over time. Additionally, after a time period, the resource monitoring tool 100 can end the test VMs to allow the computing resources to be utilized by users of the computer resource service.

Figure 6:
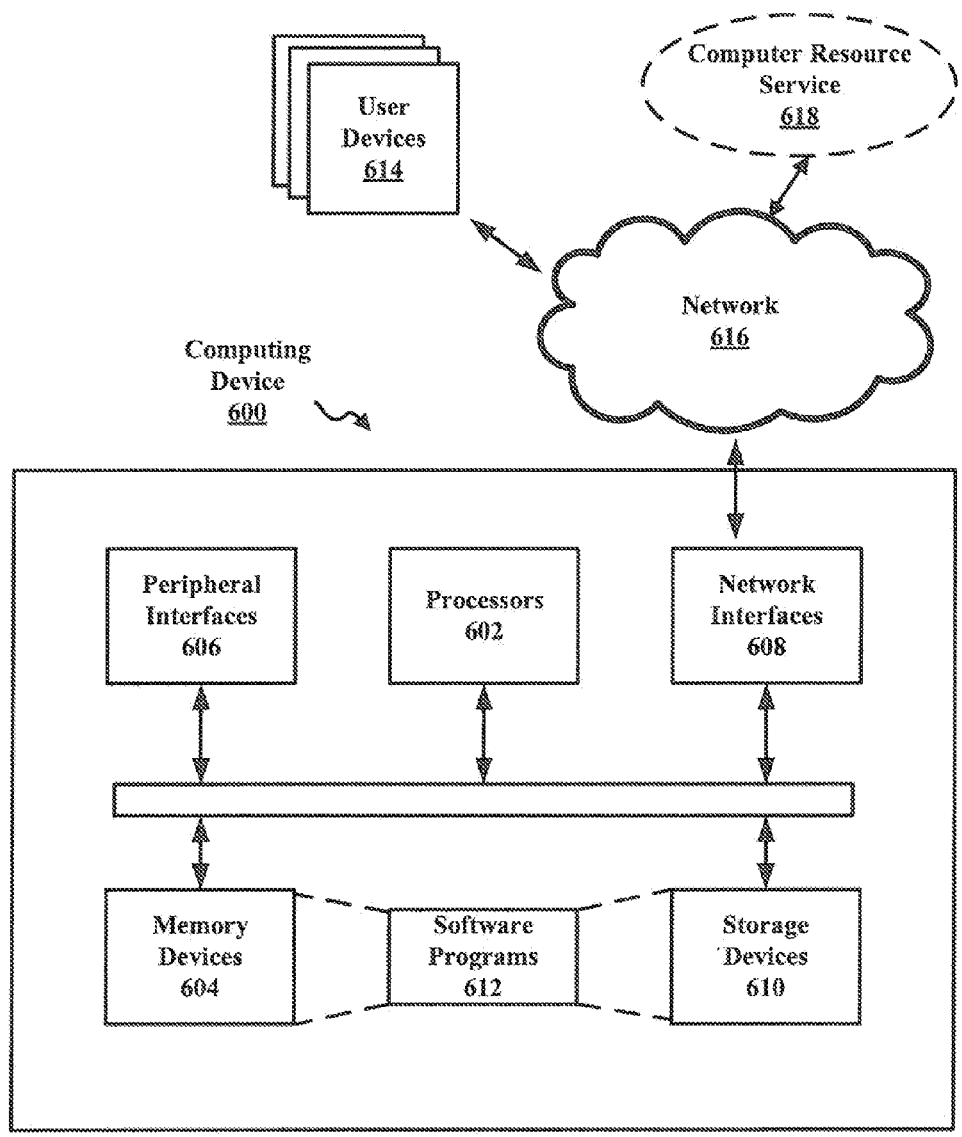
FIG. 6 illustrates an example of a hardware configuration of a computer device, according to various implementations.

FIG. 6 illustrates an example of a hardware configuration for a computing device 600 implementing the resource monitoring tool 100 that can be used to perform one or more of the processes described above. While FIG. 6 illustrates various components contained in the computing device 600, FIG. 6 illustrates one example of a computing device and additional components can be added and existing components can be removed.

As illustrated in FIG. 6, the computing device 600 can include one or more processors 602 of varying core configurations and clock frequencies. The computing device 600 can also include one or more memory devices 604 that serve as a main memory during the operation of the computing device 600. For example, during operation, a copy of the resource monitoring tool 100 can be stored in the one or more memory devices 604. The computing device 600 can also include one or more peripheral interfaces 606, such as keyboards, mice, touchpads, computer screens, touchscreens, etc., for enabling human interaction with and manipulation of the computing device 600.

The computing device 600 can also include one or more network interfaces 608 for communicating via one or more networks, such as Ethernet adapters, wireless transceivers, or serial network components, for communicating over wired or wireless media using protocols. The computing device 600 can also include one or more storage device 610 of varying physical dimensions and storage capacities, such as flash drives, hard drives, random access memory, etc., for storing data, such as images, files, and program instructions for execution by the one or more processors 602.

Additionally, the computing device 600 can include one or more software programs 612, such as the resource monitoring tool 100. The one or more software programs 612 can include instructions that cause the one or more processors 602 to perform the processes described herein. Copies of the one or more software programs 612 can be stored in the one or more memory devices 604 and/or on in the one or more storage devices 610. Likewise, the data, for example, the performance data store 114, utilized by one or more software programs 612 can be stored in the one or more memory devices 604 and/or on in the one or more storage devices 610.

In implementations, the computing device 600 can communicate with one or more remote user devices 614 and the computer resource service 618 via a network 616. The one or more remote user devices 614 can be any types of conventional computing devices. For example, the one or more user devices 614 can be desktops, laptops, servers, etc., or mobile devices, such as smart telephones, tablet computers, cellular telephones, personal digital assistants, etc. The network 616 can be any type of network, such as a local area network, a wide-area network, a virtual private network, the Internet, an intranet, an extranet, a public switched telephone network, an infrared network, a wireless network, and any combination thereof. The network 616 can support communications using any of a variety of commercially-available protocols, such as TCP/IP, OSI, FTP, UPnP, NFS, CIFS, and AppleTalk. The network 616 can be, for example, a local area network, a wide-area network, a virtual private network, the Internet, an intranet, an extranet, a public switched telephone network, an infrared network, a wireless network, and any combination thereof.

In implementations, the computing device 600 can exchange data with the one or more user devices 614 and the computer resource service 618 over the network 616. For example, the computing device 600 can receive requests for the one or more of the performance metrics from the one or more user devices 614.

The computing device 600 and the resource monitoring tool 100 can be implemented as part of at least one service or Web service, such as may be part of a service-oriented architecture. As described above, the resource monitoring tool 100 can implement an interface, for example, a Web Services API. The computing device 600 can exchange data with the one or more user devices 614, via the Web Services API, during operation of the at least one service or Web service. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

In implementations the computing device 600 can be utilized as part of a Web server architecture. In the Web server architecture, the computing device 600 can run any of a variety of server or mid-tier applications, including HTTP servers, FTP servers, CGI servers, data servers, Java servers, and business application servers. The computing device 600 also can be capable of executing programs or scripts in response requests from the one or more remote user devices 614, such as by executing one or more Web applications that may be implemented as one or more scripts or programs written in any programming language, such as Java®, C, C# or C++, or any scripting language, such as Perl, Python, or TCL, as well as combinations thereof. The computing device 600 can also include database servers, including without limitation those commercially available from Oracle®, Microsoft®, Sybase®, and IBM®.

The computing device 600 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computing device 600 as described above need not be enclosed within a single enclosure or even located in close proximity to one another. Those skilled in the art will appreciate that the above-described componentry are examples only, as the computing device 600 can include any type of hardware componentry, including any necessary accompanying firmware or software, for performing the disclosed implementations. The computing device 600 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection may be through a direct connection, or through an indirect connection via other devices, components, and connections.

For simplicity and illustrative purposes, the principles of the present teachings are described above by referring mainly to examples of various implementations thereof. However, one of ordinary skill in the art would readily recognize that the same principles are equally applicable to, and can be implemented in, many different types of information and systems, and that any such variations do not depart from the true spirit and scope of the present teachings. Moreover, in the preceding detailed description, references are made to the accompanying figures, which illustrate specific examples of various implementations. Electrical, mechanical, logical and structural changes can be made to the examples of the various implementations without departing from the spirit and scope of the present teachings. The preceding detailed description is, therefore, not to be taken in a limiting sense and the scope of the present teachings is defined by the appended claims and their equivalents.

What is claimed is:

1. A non-transitory computer readable storage medium storing instructions for causing one or more processors to perform a method for determining performance of a computer resource service, the method comprising:
   determining a set of computer systems on which to test the performance of the computer resource service, the set of computer systems comprising at least one of first computer systems and at least one of second computer systems, wherein:
      the first computer systems are located at a first location and the second computer systems are located at a second location; and
      the set of computer systems on which to test comprises a statistically significant number of computer systems from both the first location and the second location;
   initiating at least one virtual machine on each computer system in the set of computer systems, wherein the at least one virtual machine on each computer system is configured according to a first configuration;
   determining performance metrics of the at least one virtual machine executing on each computer system in the set of computer systems; and
   storing, for the at least one virtual machine, a record comprising the performance metrics, the first configuration of the at least one virtual machine, and location information of each computer system executing the at least one virtual machine.

2. The non-transitory computer readable storage medium of claim 1, wherein determining the set of computer systems, comprises:
   determining that the first computer systems comprise at least one computer system with a first hardware configuration and at least one computer system with a second hardware configuration; and selecting, to be included in the set of computer systems, the at least one computer system with the first hardware configuration and the at least one computer system with the second hardware configuration.

3. The non-transitory computer readable storage medium of claim 1, the method further comprising:

initiating at least one additional virtual machine on each computer system in the set of computer systems, wherein the at least one additional virtual machine has a configuration that differs from the first configuration;

monitoring additional performance metrics of the at least one additional virtual machine executing on each computer system in the set of computer systems; and storing the additional performance metrics.

4. The non-transitory computer readable storage medium of claim 1, the method further comprising:

installing a monitoring agent on the at least one virtual machine on each computer system in the set of computer systems, wherein the monitoring agent collects a portion of the performance metrics.

5. A computer-implemented method for determining performance of a computer resource service, the method comprising:

determining a set of computer systems on which to test the performance of the computer resource service, wherein:

each computer system in the set of the computer systems is representative of at least one of a location distribution of the computer systems or a respective configuration or an age of a portion of the computer systems; and the set of computer systems on which to test comprises at least two groups of computer systems, wherein each of the at least two groups comprises a statistically significant number of the computer systems different in at least one of the location distribution, the configuration, or the age of the computer systems relative to another of the at least two groups;

initiating at least one virtual machine on each computer system in the set of the computer systems;

monitoring, by a processor, performance metrics of the at least one virtual machine executing on each computer system in the set of computer systems; and storing, in a computer readable storage medium, the performance metrics.

6. The computer-implemented method of claim 5, the method further comprising:

installing a monitoring agent on the at least one virtual machine on each computer system in the set of the computer systems, wherein the monitoring agent collects a portion of the performance metrics.

7. The computer-implemented method of claim 6, wherein monitoring the performance metrics comprises:

receiving the portion of performance metrics from the monitoring agent.

8. The computer-implemented method of claim 5, wherein the performance metrics comprises at least one of processor performance, memory performance, input/output performance, and network communication performance.

9. The computer-implemented method of claim 5, the method further comprising:

determining, based at least in part on the performance metrics, one of the computer systems that has available computer resources; and migrating an existing virtual machine to the one of the computer systems.

10. The computer-implemented method of claim 5, the method further comprising:

determining, based at least in part on the performance metrics, one of the computer systems that requires an upgrade; and providing a notification of the required upgrade.

11. The computer-implemented method of claim 5, the method further comprising:

receiving, via a web services protocol, a request to provide a set of the performance metrics;

retrieving, based at least in part on the request, the set of the performance metrics from the performance metrics stored in the computer readable storage medium; and providing the set of performance metrics to an originator of the request.

12. The computer-implemented method of claim 5, the method further comprising:

receiving a request to initiate a virtual machine in the computer resource service; and determining, based at least in part on the performance metrics, at least one computer system from the computer systems on which to initiate the virtual machine.

13. The computer-implemented method of claim 5, wherein a first portion of the computer systems is located at a first geographic location and a second portion of the computer systems is located at a second geographic location, and wherein the set of the computer systems comprises at least one computer system from first portion and at least one computer system form the second portion.

14. The computer-implemented method of claim 5, the method further comprising:

initiating at least one additional virtual machine on each computer system in the set of the computer systems, wherein the at least one additional virtual machine has a configuration that differs from the at least one virtual machine;

monitoring, by the processor, additional performance metrics of the at least one additional virtual machine executing on each computer system in the set of computer systems; and storing, in the computer readable storage medium, the additional performance metrics.

15. A system for determining performance of a computer resource service, the system comprising:

at least one memory device comprising instructions;

a network interface configured to communicate with the computer resource service, the computer resource service comprising computer systems; and at least one processor coupled at least one memory device and network interface and configured to execute the instructions to perform a method comprising:

determining a set of the computer systems on which to test the performance of the computer resource service, wherein:

each computer system in the set of the computer systems is representative of at least one of a location distribution of the computer systems or a respective configuration or an age of a portion of the computer systems; and the set of computer systems on which to test comprises at least two groups of computer systems, wherein each of the at least two groups comprises a statistically significant number of the computer systems different in at least one of the location distribution, the configuration, or the age of the computer systems relative to another of the at least two groups;

initiating at least one virtual machine on each computer system in the set of the computer systems;

monitoring, via the network interface, performance metrics of the at least one virtual machine executing on each computer system in the set of computer systems; and storing, in a computer readable storage medium, the performance metrics.

16. The system of claim 15, wherein the at least one processor is further configured to execute the instructions to perform the method further comprising:

installing a monitoring agent on the at least one virtual machine on each computer system in the set of the computer systems, receiving, via the network interface, a portion of the performance metrics from the monitoring agent.

17. The system of claim 16, wherein the monitoring agent comprises instructions to execute on the at least one virtual machine and collect the performance metrics comprising at least one of processor performance, memory performance, input/output performance, and network communication performance.

18. The system of claim 15, wherein the at least one processor is further configured to execute the instructions to perform the method further comprising:

determining, based at least in part on the performance metrics, one of the computer systems that has available computer resources; and migrating an existing virtual machine to the one of the computer systems.

19. The system of claim 15, wherein the at least one processor is further configured to execute the instructions to perform the method further comprising:

determining, based at least in part on the performance metrics, one of the computer systems that requires an upgrade; and providing a notification of the required upgrade.

20. The system of claim 15, wherein the at least one processor is further configured to execute the instructions to perform the method further comprising:

receiving, via the network interface, a request to provide a set of the performance metrics;

retrieving, based at least in part on the request, the set of the performance metrics from the performance metrics stored in the computer readable storage medium; and providing, via the network interface, the set of performance metrics to an originator of the request.

21. The system of claim 15, wherein the at least one processor is further configured to execute the instructions to perform the method further comprising:

receiving a request to initiate a virtual machine in the computer resource service; and determining, based at least in part on the performance metrics, at least one computer system from the computer systems on which to initiate the virtual machine.

22. The system of claim 15, wherein a first portion of the computer systems is located at a first geographic location and a second portion of the computer systems is located at a second geographic location, and wherein the set of the computer systems comprises at least one computer system from first portion and at least one computer system form the second portion.

23. The system of claim 15, wherein the at least one processor is further configured to execute the instructions to perform the method further comprising:

initiating at least one additional virtual machine on each computer system in the set of the computer systems, wherein the at least one additional virtual machine has a configuration that differs from the at least one virtual machine;

monitoring additional performance metrics of the at least one additional virtual machine executing on each computer system in the set of computer systems; and storing a record the additional performance metrics.

* * * * *